US011854026B2

United States Patent
Protz

(10) Patent No.: US 11,854,026 B2
(45) Date of Patent: Dec. 26, 2023

(54) SYSTEM AND METHODS FOR MEASURING VALUES OF PERCEPTION VARIABLES

(71) Applicant: Smart Sensory Analytics LLC, West End, NC (US)

(72) Inventor: Daniel Protz, Zurich (CH)

(73) Assignee: Smart Sensory Analytics LLC, West End, NC (US)

(*) Notice: Subject to any disclaimer, the term of this patent is extended or adjusted under 35 U.S.C. 154(b) by 96 days.

(21) Appl. No.: 16/628,221

(22) PCT Filed: Jul. 13, 2018

(86) PCT No.: PCT/US2018/041914
§ 371 (c)(1),
(2) Date: Jan. 2, 2020

(87) PCT Pub. No.: WO2019/014508
PCT Pub. Date: Jan. 17, 2019

(65) Prior Publication Data
US 2021/0073836 A1    Mar. 11, 2021

(30) Foreign Application Priority Data

Jul. 12, 2017   (WO) ................. PCT/EP2017/067643

(51) Int. Cl.
*G06Q 30/0203* (2023.01)
*G06F 16/583* (2019.01)
(Continued)

(52) U.S. Cl.
CPC ....... *G06Q 30/0203* (2013.01); *G06F 3/0482* (2013.01); *G06F 16/5838* (2019.01);
(Continued)

(58) Field of Classification Search
CPC ............ G06Q 30/0203; G06Q 30/0201; G06F 16/5838; G06F 3/0482; G06N 20/00; G06N 7/005
(Continued)

(56) References Cited

U.S. PATENT DOCUMENTS 7,593,863 B1 *  9/2009  Sunshine ................ G06Q 30/02
                                                    705/15
2006/0041386 A1 * 2/2006  Vignalou-Marche ........................
                                                    G01N 33/02
                                                    702/19
(Continued)

FOREIGN PATENT DOCUMENTS

KR        20180103297 A  *  9/2018  ........... A61B 5/4017

OTHER PUBLICATIONS

Mamlouk, Perception Space Analysis: From Color Vision to Odor Perception, Jun. 28, 2017 (Year: 2017).*
(Continued)

*Primary Examiner* — Charles Guiliano
*Assistant Examiner* — Po Han Lee
(74) *Attorney, Agent, or Firm* — Blank Rome LLP

(57) ABSTRACT

A method and system are described for generating a quantified perception profile of a predetermined stimulus. The method may be used in colorimetry or flavor quantization. Flavor descriptors are selected from database for the particular product and presented pairwise in all possible pair combinations to each of a plurality of tasters via user-devices. For each flavor descriptor pair, users select one of the descriptors which is perceived to be more intense than the other. The results of the selections are captured at host and mapped by normalizing means as intensity values into a flavor descriptor space in database to create a quantized flavor profile. Normalizing means performs a weighting on
(Continued)

each descriptor selection result. Filtering means detects anomalous or inconsistent selection responses and issues adaptive control instructions.

17 Claims, 7 Drawing Sheets

(51) Int. Cl.
 *G06N 20/00* (2019.01)
 *G06F 3/0482* (2013.01)
 *G06Q 30/0201* (2023.01)
 *G06N 7/01* (2023.01)

(52) U.S. Cl.
 CPC ............... *G06N 7/01* (2023.01); *G06N 20/00* (2019.01); *G06Q 30/0201* (2013.01)

(58) Field of Classification Search
 USPC ........................................................ 705/7.32
 See application file for complete search history.

(56) References Cited

U.S. PATENT DOCUMENTS

| | | | |
|---|---|---|---|
| 2011/0135195 A1* | 6/2011 | Marchesotti | H04N 1/60 |
| | | | 382/165 |
| 2012/0143802 A1* | 6/2012 | Balakrishnan | G06F 17/18 |
| | | | 706/14 |
| 2014/0207522 A1 | 7/2014 | Smith | |
| 2014/0255882 A1* | 9/2014 | Hadad | G09B 19/0092 |
| | | | 434/127 |
| 2015/0199608 A1* | 7/2015 | Pinel | G06Q 10/067 |
| | | | 706/46 |
| 2016/0216244 A1 | 7/2016 | Sobel et al. | |
| 2017/0010247 A1* | 1/2017 | Tompkins | G01N 33/146 |
| 2017/0148084 A1* | 5/2017 | Axelsson | G06F 16/2457 |
| 2022/0129709 A1* | 4/2022 | Canal | G06F 9/4451 |

OTHER PUBLICATIONS

"Perception Space Analysis: From Color Vision to Odor Perception" to Mamlouk et al., Jul. 3, 2017 (Year: 2017).*

* cited by examiner

SYSTEM AND METHODS FOR MEASURING VALUES OF PERCEPTION VARIABLES

This application is a national stage of International Application No. PCT/US2018/041914, filed on Jul. 13, 2018, which claims priority to International Application No. PCT/EP2017/067643, filed on Jul. 12, 2017. The contents of those applications are incorporated herein by reference in their entireties.

TECHNICAL FIELD OF THE INVENTION

The present invention relates to computer-implemented systems and methods for empirically measuring a person's perception of a predetermined stimulus. In particular, it relates to the rendering in multivariate parameter space the perception of the stimulus, based on a predetermined set of variables which characterize the stimulus. In a first example application of the invention, the stimulus may be a colored region of a computer display, and the perception variables may include the brightness, the contrast, or the perceived color expressed in terms of a standardized library of descriptors such Pantone® numbers or a definition in a color space (e.g. RGB). In a second example application of the invention, the predetermined stimulus may be the flavor or aroma, or other perceivable characteristic, of a foodstuff, in which case the invention relates to the rendering, in normalized flavor profile space, of the perceived characteristic(s) of the foodstuff—a flavor space which can be mapped on to a predetermined library of flavor notes, for example.

BACKGROUND OF THE INVENTION

In many areas of industry, it is important to be able to reliably measure the perception of particular characteristics of a product. A manufacturer of computer displays, for example, is typically able to specify with great precision the color gamut and the intensity depth of a particular display, using colorimetry. Colorimetry may be defined as "the technology used to quantify and describe human color perception in physical terms", and it aims to render visible color characteristics into physical correlates of color perception, such as color space tristimulus values. A display manufacturer may employ color engineers, experienced in colorimetry, to characterize the color space and the intensity characteristics of the display output when the display undergoes calibration and quality control. Since the color engineer cannot reliably measure the actual perception of the color and intensity stimuli as they are perceived by a user of the display, traditional colorimetry techniques are limited to measuring characteristics (color temperature, spectral radiance, reflectance, tristimulus values etc) of the display and of the light emitted by the display. In reality, however, the user's perception of color does not only depend on the physical characteristics of the emitted light. It also depends on environmental variables such as the type and brightness of ambient light, the viewing angle, air cleanness/diffusion, moiré interferences or even room temperature or the time of day, and it may also depend on user-specific variables such as the user's age, ophthalmic physiology, or afterimage effects, for example. It would in theory be possible to carry our detailed measurements of such environmental and user variables, and thereby produce high-resolution perception profiles which relate different values of the perception variables to different values of the color/intensity stimuli. However, this would in practice be complex and laborious, and virtually impossible to achieve, at least in real time. It would also mean acquiring large amounts of data (users' foveal scans, local environment data etc.) which would be of no direct interest to the manufacturer of the computer display, and would only provide perception profile data for the particular combination(s) of colorimetry variables and stimuli.

Similar problems exist with the empirical measurement of colorimetry in other technical fields, such as in the manufacture of paints and coatings, where the perception is of reflected light, or transmitted light, or both. Experienced color-matchers are able to express colorimetric perceptions of hue, tone and surface texture in codified terms. Surface texture can have a profound effect on the perceived color of a surface, especially where the colorimetry is determined mainly by the reflectance characteristics of the surface. Where two or more color-matchers are required to collaborate, they may use a common library of codified colorimetry terms and calibrate their measurements against the common library.

The colorimetry techniques described above may in principle be used to quantify and normalize any human perception where the sensed quantities are measurable. Sound-waves in air, for example, can be measured with precision using transducers and acoustic analyzers, and the auditory perception of the sound spectra can be rendered as a multi-dimensional acoustic grid or map which may be used in architectural acoustic engineering, for example.

Techniques analogous to colorimetry may also be used in the quantification of the human perception of touch, taste and smell. As with colorimetry, the human perception of the flavor and aroma of a substance is the perception of the interaction of taste receptors with physical or chemical quantities such as the molecular composition of the substance, which can be measured using chemistry or mass-spectrometry techniques, for example. As with colorimetry, the perception flavor and aroma of a substance could in theory be measured in detail for an individual, taking into account external environmental variables and user-related variables (e.g. genetic factors which may affect perception of molecules such as phenylthiocarbamide) in a similar fashion, but in practice the task would be impracticable, and it would generate large amounts of redundant data. As with colorimetry, the human perception of flavor and aroma can be characterized using a codified library of terms.

In the description below, the invention will be mainly described using the example of flavor perception. However, the principles of the invention are also applicable to other kinds of human perception, particularly where the perception variables are objectively measurable (such as sensation of color vision, acoustics, texture/touch etc.).

PRIOR ART

In order to accurately quantify the perception of a color stimulus (a graphic on a computer display, for example) at high resolution, it is known to compare the displayed color against printed charts or color swatches. Alternatively, experienced colorimetrists may refer to an agreed set of standardized reference descriptors to select the closest value or combination of values of the descriptors. However, this is a time-consuming process and prone to inaccuracy and inconsistency.

In order to quantify the perception of the flavor of a substance accurately, it would in theory be possible, as mentioned above, to isolate the individual flavor-determining constituents of the substance and analyze (for example using chemical or biochemical techniques) the perceived flavor characteristics of each constituent and each combination of constituents, for different types of taster. However, this is likely to be impracticable. Instead, it is usual to employ panels of experienced human tasters, and to train the tasters to ensure a consistent, repeatable evaluation of the flavor or aroma concerned. Taster panels are expensive to set up, and the tasters require ongoing training and calibration against other tasters of the same panel and/or other panels. Such taster panels, which typically include a small number of highly-trained tasters, are expensive and have limited capacity in the number of tastings they can carry out. The tasters may typically be required to distinguish between thousands of different flavor notes. They work together in one place, in a standardized environment, and their taste evaluations are monitored to ensure that individual tasters are applying the flavor descriptors in the same way as the other members of the panel. Tasters are trained on a scale of intensities for flavor, texture and aroma. To ensure consistency and accuracy each taster must submit multiple redundant evaluations which are then averaged across a group. This creates a considerable need for data storage and processing capacity to develop even a single flavor profile. Further, because these scales must be collected individually for each food product test, without reuse, the method generates a significant storage capacity requirement when scaled across multiple products or panels. Scaling up traditional perception quantization systems to hundreds or thousands or tens of thousands of users would be unconscionable because the data processing and storage infrastructure which would be required in order to process all the data required for creating high-resolution descriptor spaces would be impracticably large. Such a system would also not be able to adapt in real time. Furthermore, the work is time-consuming. It may take even a skilled, experienced taster an hour to characterize the flavors of a product, for example. Traditionally, different systems use different proprietary libraries of flavor descriptors, which means that it is difficult, if not impossible, for the flavor evaluations of one system, based on one flavor descriptor library, to be compared with flavor evaluations of another. It also makes it difficult for trained panelists to switch to a different system.

Similarly, with colorimetry, while color parameters which relate to the physical characteristics of the emitted light may be mapped or transposed numerically between color representation systems, the systems of characterizing the color perception variables may be difficult or impossible to map in the same way.

Further, because existing quantitative evaluation methods for colors and foodstuffs require specialized training, such known techniques make the measurement of individuals' taste perception impossible.

In perception-quantizing systems such as the colorimetry and tasting systems mentioned above, the descriptor space may comprise a large number (many thousands or even hundreds of thousands) of variables (e.g. colors or flavor notes) for characterizing the stimulus (e.g. color of a displayed graphic or flavor of a foodstuff). There is a need for a simpler and more consistent method of generating such a high-resolution multivariate descriptor space.

BRIEF DESCRIPTION OF THE INVENTION

The invention seeks to overcome at least some of the above and other disadvantages inherent in the prior art. In particular, the invention aims to provide a method according to claim 1, and a system according to claim 16. Further variants of the invention are set out in the dependent claims.

By acquiring and normalizing a large number of pairwise descriptor quantizations, based on a small set of descriptor variables, it is possible to generate a high-resolution descriptor space with fine granularity (i.e. a much larger number of descriptor variables). The small size of the set on which the pairwise quantizations (user-selections) are based means that the descriptors of the set can be given simple identifiers which are understandable to a large number of people, and to people without detailed experience of the particular descriptor quantization. Whereas previously, a fine-grained library of descriptor identifiers was required to describe the variables used to define the high-resolution descriptor space, the method of the invention enables a high-resolution descriptor space to be created using the much smaller set of user-friendly descriptor identifiers, by presenting many of the simpler descriptor pairs to many users for selection. Furthermore, the system is thereby scalable to an unlimited degree. Previous systems were limited by the granularity of the descriptors which individual users (expert panel members) could differentiate. The method of the invention permits a higher resolution descriptor space to be created without requiring greater skill or expertise of the users.

By capturing many answers to pairwise comparison questions, therefore, it is possible to achieve a similar quality of perception variable (descriptor) quantization as achieved by expert colorimetrists or tasting panels, but without requiring the colorimetrists/tasters to be trained, and without the need for large-scale data processing capacity to compute results. Furthermore, the descriptor characterization achieved is consistent and can be quantized in such a way as to provide a normalized descriptor space, thereby allowing different quantizations to be carried out by disparate groups of users in different locations. The pairwise interrogation, and the automated processing of the pairwise responses, also offer a significant decrease in time taken by each user—a few minutes instead of an hour or more using traditional methods. Despite the reduction in time required for user participation, the accuracy of the resulting perception profile can be greatly increased. In addition, all the collected data points (user selections) in the descriptor space contribute with more or less significance to the improved accuracy of the perception profile.

The above advantages can be achieved in particular using the adaptive variant of the method, described below, in which the selection and/or sequencing of the pairwise descriptors are is determined based on users' past selections This adaptive variant also reduces the amount of network traffic (fewer user interactions) and reduces the collection of redundant information. This increases processing speed and reduces storage and processing capacity requirements. It also permits the resolution of the descriptor space to be varied to suit different requirements. Certain regions of the descriptor space may comprise more useful information than others, for example, and these regions can be characterized at a higher resolution (a greater density of descriptor pair points). The invention also facilitates the creation of a standardized interface whereby the descriptor space (e.g. color/aroma/flavor) can be matched to other descriptor libraries, such that the descriptor space and/or acquired perception profiles can easily be mapped to other descriptor spaces such as the proprietary in-house descriptor spaces of color display manufacturers, food manufacturers or fragrance houses, for example.

The invention and its advantages will be further explained in the following detailed description, together with illustrations of example embodiments and implementations given in the accompanying drawings, in which.

Figure 1:
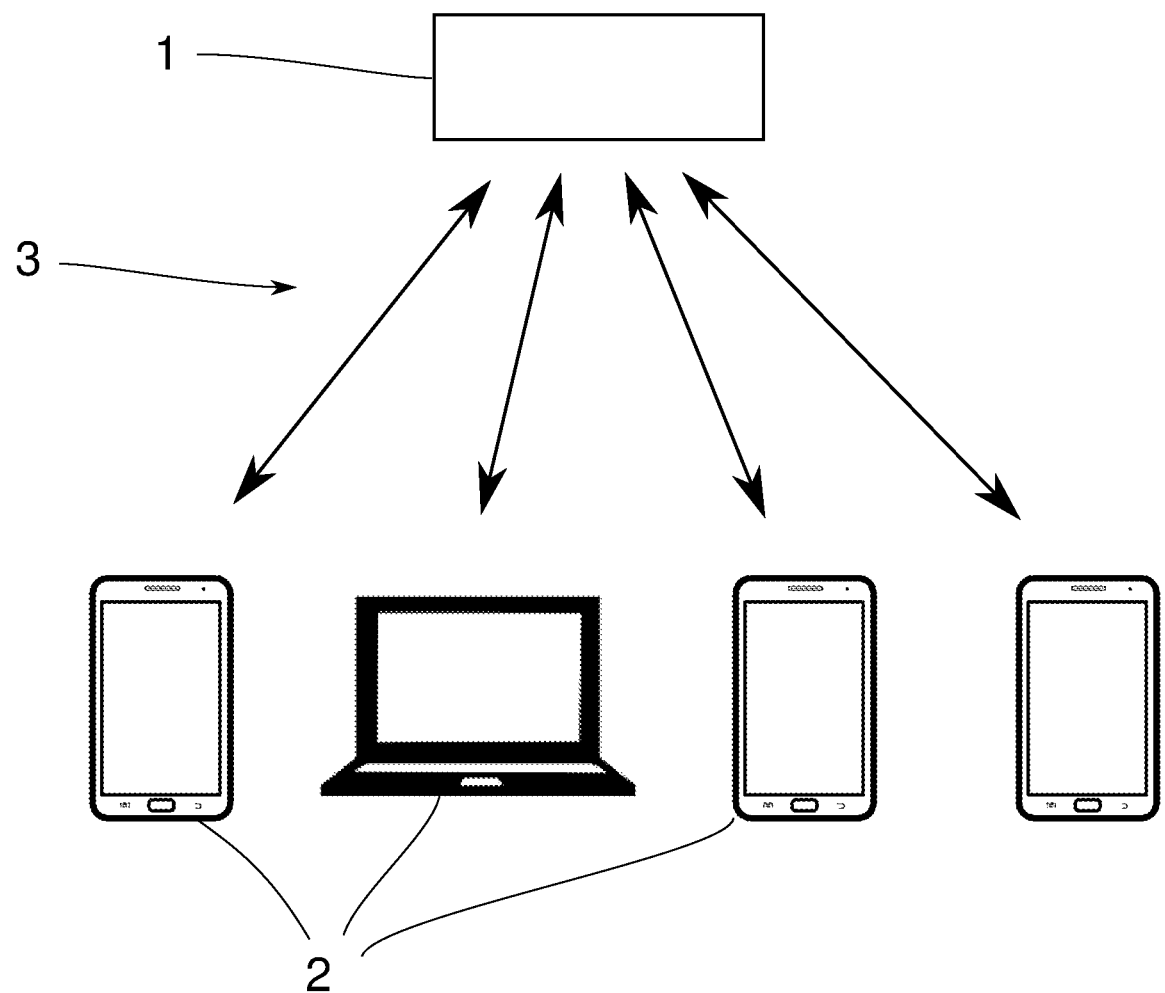
FIG. 1 shows an example server-client system for carrying out a method according to the invention.

The drawings are intended merely as illustrations of example embodiments of the invention, and are not to be construed as limiting the scope of the invention. Where the same reference numerals are used in different drawings, these reference numerals are intended to refer to the same or corresponding features. However, the use of different reference numerals should not in itself be taken as an indication of any particular difference between the referenced features.

The term "color" is used in this text to include, in addition to chromatic and spectral parameters, other parameters which can be used to characterize emitted or reflected or transmitted light, such as intensity, radiance, surface texture etc.

The term "flavor" is used in this text to include aromas. References to "food" or "foodstuff" should be understood to include any edible, drinkable, inhalable or smellable substance or product.

DETAILED DESCRIPTION OF THE INVENTION

FIG. 1 shows in greatly simplified schematic form a system which can be configured to carry out the method of the invention. A back-end server 1, also referred to as a host or a cloud platform, is arranged to communicate with multiple user-devices 2 such as smart-phones, laptops, tablets or desktop computers over a communications network 3, such as the internet. As will be described below, the host 1 is configured to transmit descriptors to the user-devices 2 and to collect and process descriptor selection responses from the user-devices 2.

Figure 2:
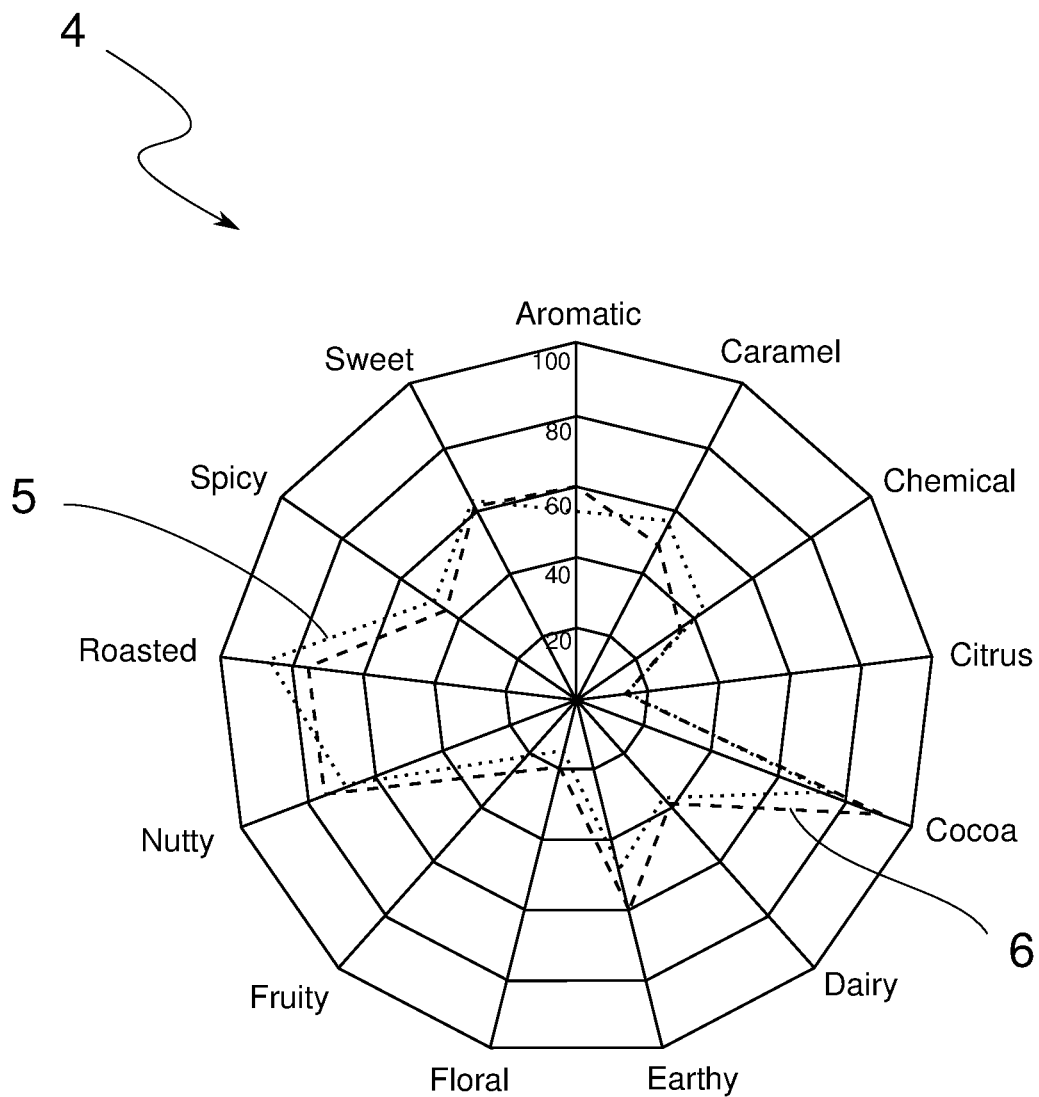
FIG. 2 shows an example of a flavor descriptor space where the stimulus is a taste of a substance under analysis.

FIG. 2 shows a graphical representation of a flavor descriptor space 4 for representing the flavor profile of a foodstuff. In this example, thirteen flavor descriptors are depicted on thirteen radial axes, each with an intensity scale of 0-100%. The thirteen descriptors have been pre-selected in this example as being suitable for characterizing dark chocolate products. Two different dark chocolate products are characterized by the dotted and dashed lines 5 and 6.

Figure 3:
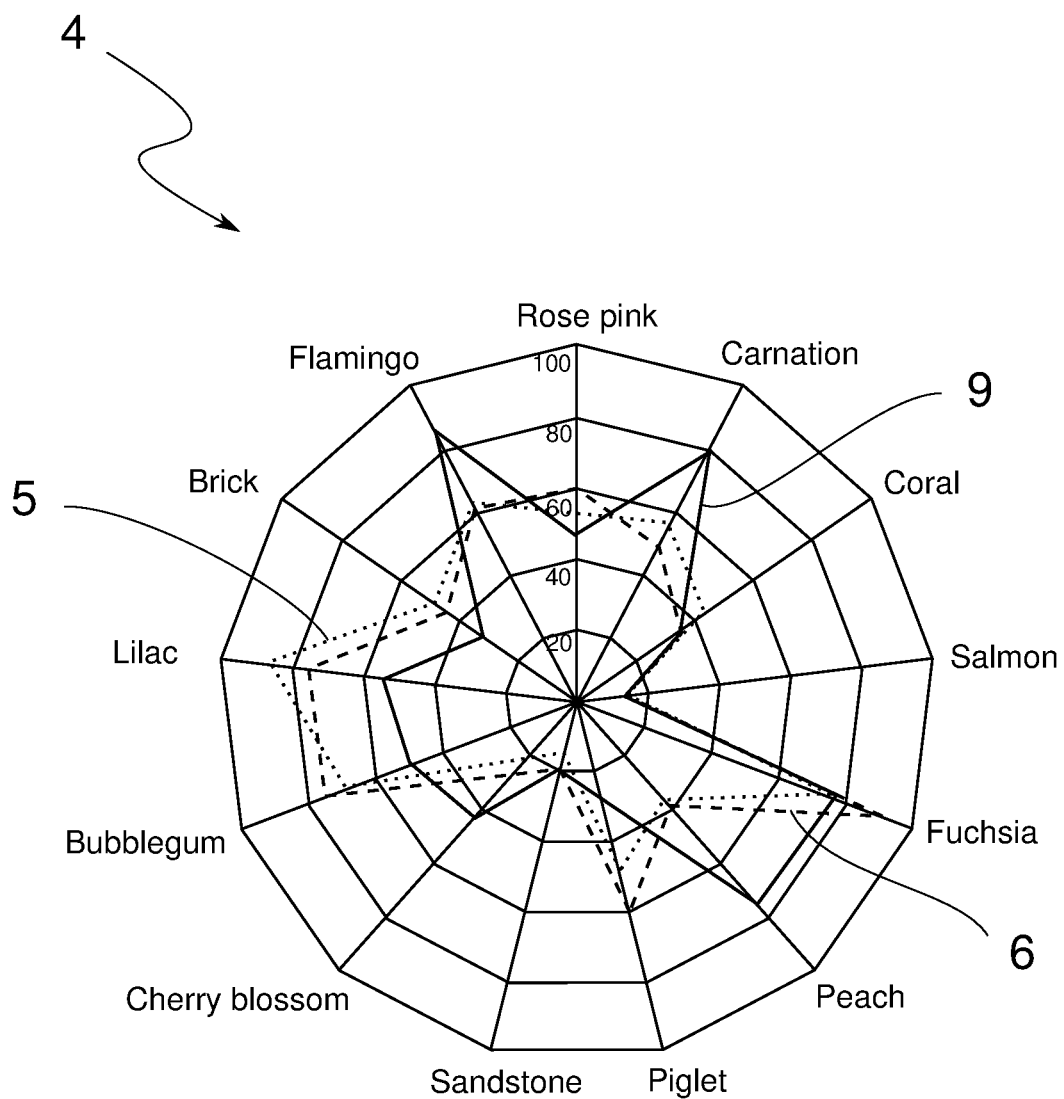
FIG. 3 shows an example of a color descriptor space where the stimulus is a a pale red colored region displayed on a computer under analysis.

A similar descriptor space is shown in FIG. 3, for the colorimetry application described above. If the stimulus is a pale-red graphic element displayed on a computer screen, the descriptor variables may include hues such as "lilac", "rose pink", "coral", "salmon" etc. The visual perception of caucasian humans tends to be sensitive to such pale pink tones, and manufacturers of video displays may require higher resolution quantization of the descriptors in this color sub-space.

The remainder of the description below refers mainly to the flavor/aroma application as an example, but it should be understood that the same principles may be used in other applications, such as colorimetry, auditory etc.

Figure 4:
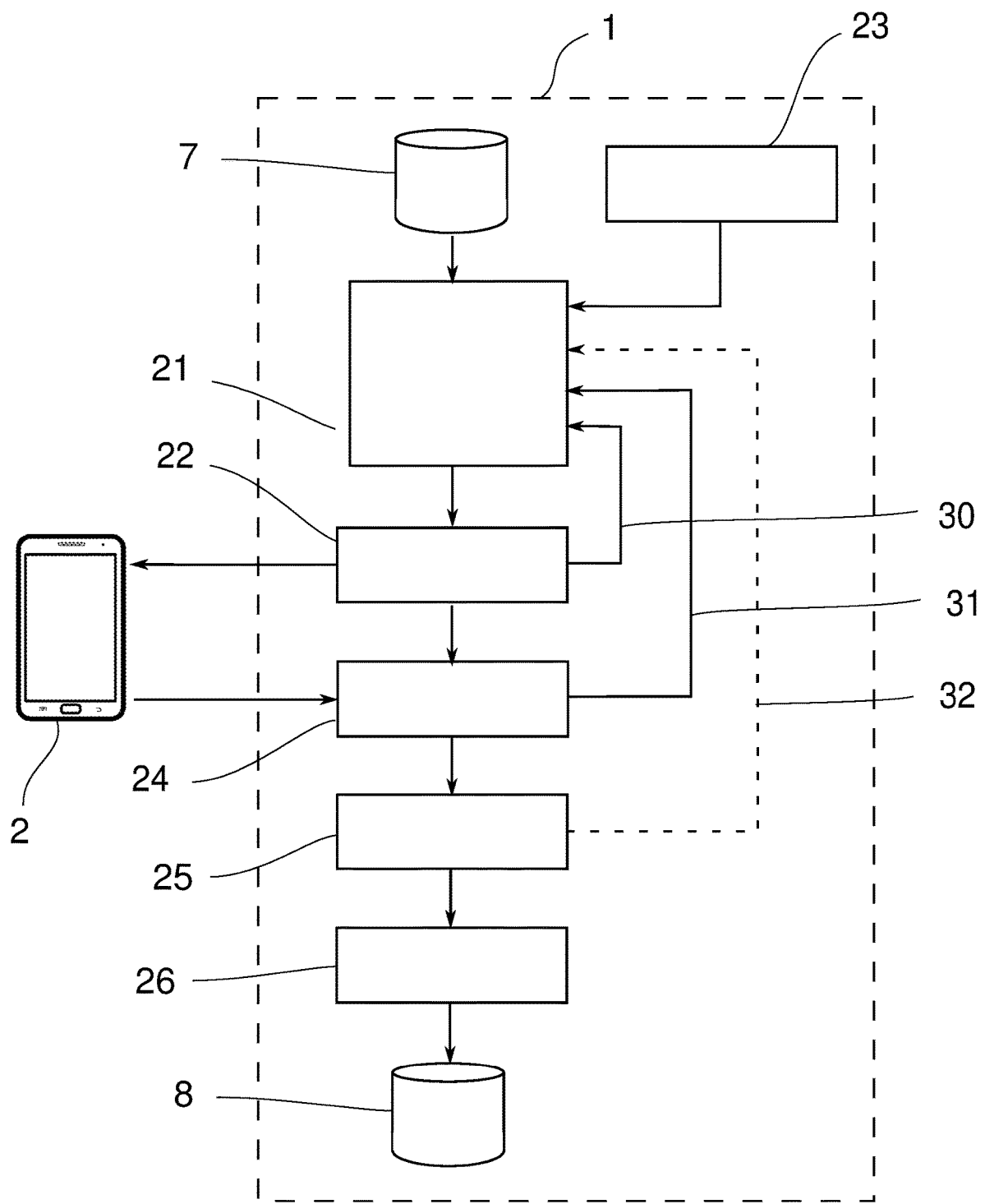
FIG. 4 shows in more detail a first example of a server-client configuration for carrying out a method according to the invention.

FIG. 4 shows in more detail an example of the functional elements of a first example implementation of the host 1 of FIG. 1. Note that the host 1 need not be a single device, but may comprise multiple devices or a virtual device running on a cloud platform or virtual server. A set of flavor descriptors (also referred to as flavor notes) suitable for the particular product or type of product under analysis are stored in a database 7. In the case of a chocolate product, the flavor descriptors may include the thirteen descriptors shown in FIG. 2, for example. Descriptor selection means 21 selects pairwise combinations of the descriptors, optionally under control of randomizing means 23, and preferably such that each user device 2 receives (from transmission means 22) all the pairwise combinations of the descriptors in the database 7. In the chocolate example with 13 descriptors, there are 78 possible pairings of descriptors. The pairs of flavor descriptors are selected by selection means 21 and transmitted to the user device 2.

At each user device 2, the pairs of flavor descriptors are presented (e.g. on a display screen) for selection by the user of the device 2. The user indicates, for example by swiping to the left or the right on a touch screen or touching a button graphic, or otherwise, which of the presented two flavor descriptors more closely reflects his or her perception of the flavor of the product. Each user selection is transmitted to a receiving interface 24 at the host 1 for filtering 25 and normalizing 26. The pairwise interrogation is preferably repeated 30 for each of the flavor descriptor pairs, and the process is repeated 31 for each of the user devices 2. In the colorimetry application, colors corresponding to the descriptors may optionally be displayed in addition to, or instead of, the textual descriptor terms.

As described above, the pairs may be transmitted sequentially from the host 1 to the user device 2. Alternatively, the set of pairs for one product for one taster may all be transmitted together, or in batches of multiple pairs, to the user device 2. Similarly, the user device 2 may transmit the response selections to the receiving means 24 in real time, i.e. as the selections are made, or it may accumulate some or all of the responses before transmitting them all together or in batches of multiple responses to the receiving means 24.

Filtering means 25 may be provided for filtering out anomalous user-selections, or for excluding a particular user's selections from the selection data which is to be mapped into the flavor descriptor space in database 8, or for weighting user selections according to some other criterion. Optionally, an output 32 from the filtering means 25 may be used as an adaptive control input to the selection means 21 such that the selection of flavor descriptor pairs may be carried out adaptively, for example in order to repeat interrogation of descriptor pairs for which an anomalous user-selection has been detected by the filtering means 25. As will be described below, filtering means 25 may be implemented as a machine learning function and/or knowledge base of previous user selection patterns.

The user-selections corresponding to the flavor descriptor pairs are adjusted by normalizing processor means 26 to map the selections into a multi-dimensional flavor descriptor intensity space which may be implemented as a suitable data structure in database 8. The normalizing means 26 weights each flavor descriptor in order to normalize the intensity values with respect to the other descriptor intensity scores. The normalizing process will be described in more detail below.

Figure 6:
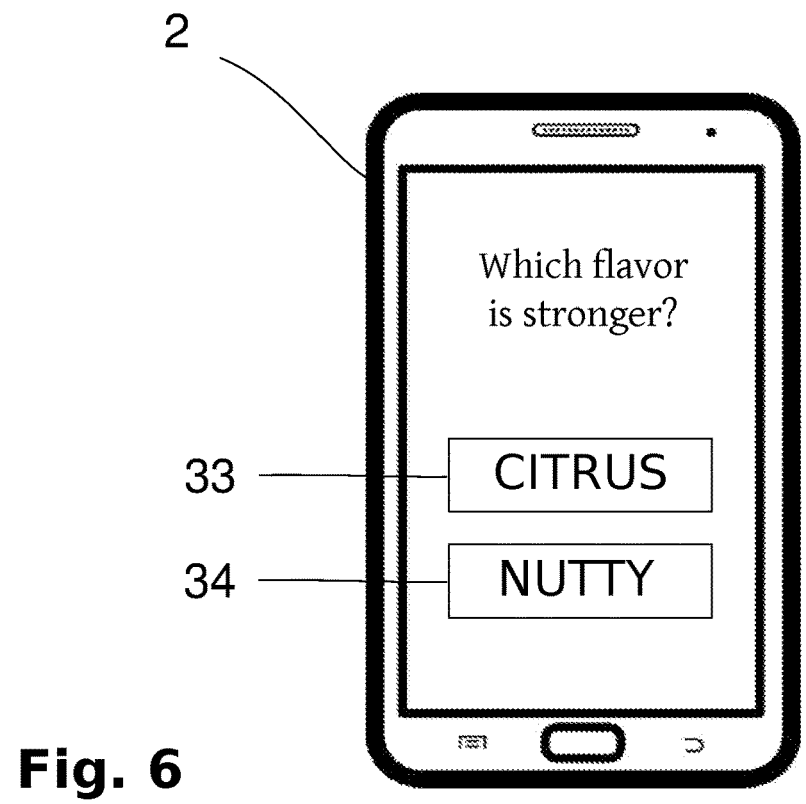
FIG. 6 shows a first variant of a user-device for carrying out a method according to the invention.

FIG. 6 shows an example of a graphical representation of one of the descriptor pairs on the touchscreen of a smartphone. In response to the displayed prompt, the device user (taster) indicates which of the two displayed descriptors "CITRUS" and "NUTTY" more closely describes the flavor of the substance being tasted. The user then selects the "winning" descriptor and the selection is recorded and transmitted to the host 1, whereupon the next descriptor pair is displayed on the screen.

Figure 5:
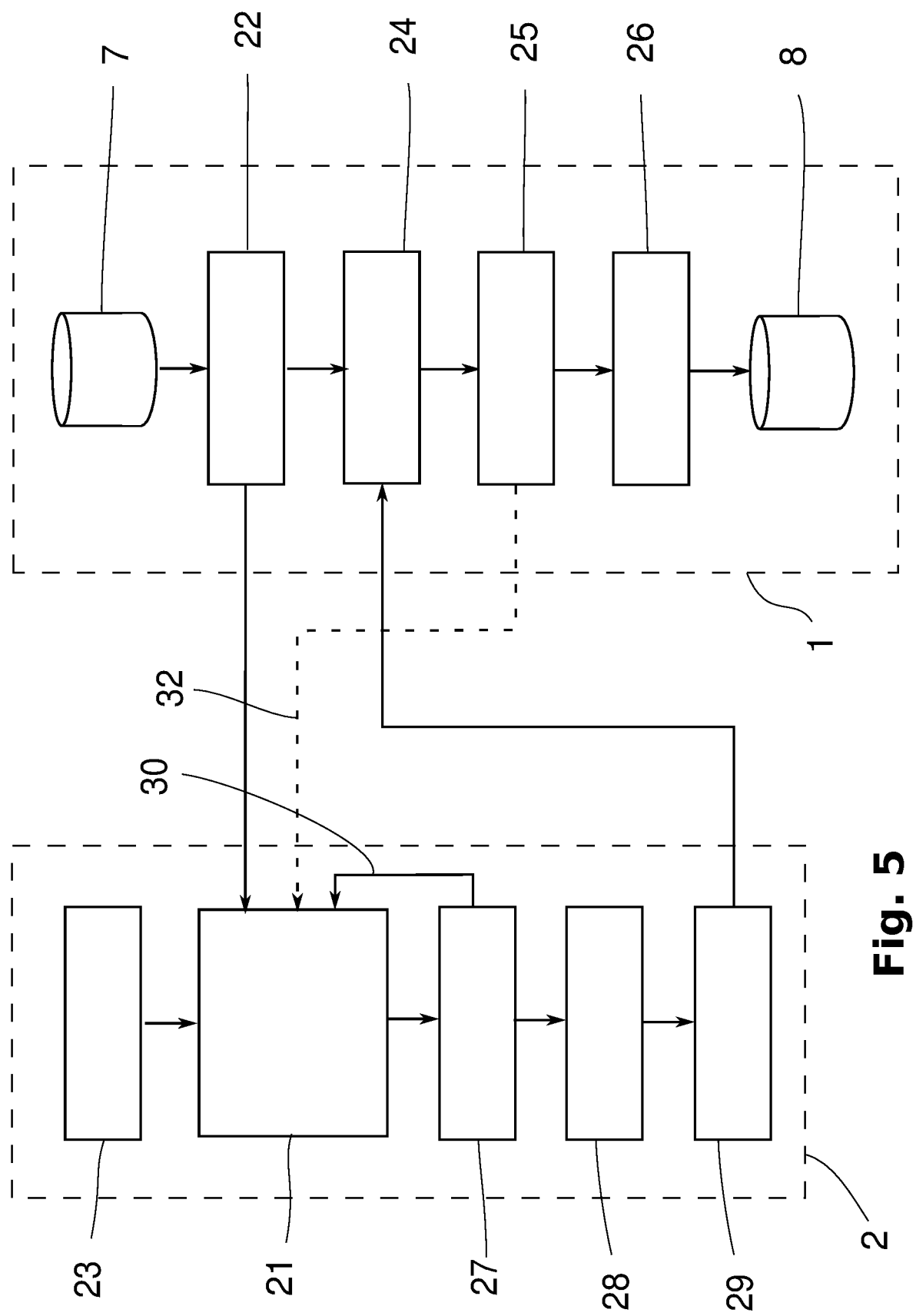
FIG. 5 shows in more detail a second example of a server-client configuration for carrying out a method according to the invention.

FIG. 5 shows an alternative implementation of a server-client system for carrying out the invention. Only one user device 2 is shown, but it should be understood that a similar transmitting/receiving arrangement exists between the host 1 and each of the user devices 2. The functions of the host 1 of FIG. 4 in this example are instead partially carried out at the user device 2. Thus, the transmitting means 22 transmits the flavor descriptors (for example the set of thirteen descriptors in the case of the dark chocolate products shown in FIG. 2) to the selection means 21, which is located at the user device 2. The selection means 21 may be a mobile app, or a part of the functionality of a mobile app, for example. The selection means 21 generates the combinations of flavor descriptors (78 pairs in the chocolate example of FIG. 2), optionally under control of randomizing means 23, and the (optionally randomized) pairs are presented, preferably one at a time, by user-interface output means 27 (e.g. display, audio output etc) at the user device 2. For each descriptor pair, the user's choice is recorded by user interface input means 28 (e.g. touch-screen, keyboard, mouse, audio input) and transmitted by transmission means 29 of the user device 2 to the receiving means 24 at the host 1. As with the implementation illustrated in FIG. 4, the responses can be transmitted individually, in real time, or batch-wise or all together once all the descriptor pairs have been presented and the selections recorded.

Randomizing means 23 may be implemented using any suitable random or pseudo-random number generation algorithm. Furthermore, based on the responses of the individual and group responses, questions are adapted so as to avoid collection of redundant information which is "known" based on the previous answers. Additionally, or alternatively, each answer may be dynamically filtered for accuracy and consistency when compared with the individual user's previous answers. In this way, the questioning can adapt to the tasting skill level of the respondent, so as to capture accurate and relevant data to the level possible for each individual user. This increases the depth of information that can be captured, while eliminating redundant or misleading data that would increase storage and processing requirements.

As mentioned above, the descriptor pairs may advantageously be generated dynamically, in real time. This so-called 'smart' generation of the descriptor pairs may be adapted to eliminate or reduce the occurrence of pairs which are judged unlikely to provide significant additional characterization data of the stimulus (pairs to which all users consistently in the same way, for example, or pairs which relate to a region of the descriptor space where it has been assessed that an individual user has a poor record of consistency). Certain pairs may lie in a region of the descriptor space where there is already sufficient data density, so these may be partially or completely suppressed. Or the opposite may be the case—a region of particular interest in the descriptor space may be sparsely populated, in which case more pairs could be generated for this region. In a situation where users are randomly located around the world, it may be that certain regions are under or over-represented, in which case the number and type of pairs may be dynamically adjusted in real time response. The age of the data points in the descriptor space may also be taken into account. For example, if the data in a particular region are unusually old, then the number of new descriptor pairs may be increase to replace or supplement the existing data. In some applications, users' perceptions may change with time, so it may be important to update the descriptor space.

Filtering means 25 may be configured to use hierarchical descriptor data, where descriptors are provided at different degrees of granularity, inheriting descriptor characterisics from descriptors higher in the hierarchy. For example, in the flavor application, the flavor of a yogurt product may initially be quantized using high-level descriptors (creamy, fruity, sweet, vanilla etc), and the filtering means 25 may employ a machine learning algorithm which automatically detects when the user responses of a particular type have reached a predetermined level of convergence (i.e. when presenting further pairwise descriptors achieves a diminishing level of returns). At this stage, the filtering means 25 may be configured to automatically move to a higher-granularity of descriptor (lower in the hierarchy). This change of granularity occur in either direction, and may be repeated as often as necessary. For example, a when the stimulus is the taste of a strawberry yogurt, the filtering means 25 may relatively quickly move to a high-granularity using strawberry flavor descriptors (of which there are many).

if a convergence of the user responses is detected for a particular region in the descriptor space, the filtering means may In the flavor application, for example, Filtering means 25 is provided for detecting illogical, inconsistent or incomplete selection results, for example, and optionally to instruct the selection means 21 to repeat particular pairs or otherwise adapt the sequence of pairs presented to the user(s). In order to cope with a situation where a taster provides an incomplete set of selection results, the filtering means 25 may comprise a Bayesian or other statistical analysis engine for inferring, for example from the taster's other selection results, the values of the missing selection parameters.

Normalizing means 26 is configured to normalize the selection results and to map them into a flavor profile space, such as the example depicted in FIG. 2, in database 8. In a traditional manual flavor evaluation environment, where the flavor notes are evaluated by individual trained tasters, a scaling of each flavor note can be carried out independently. This means that an additional flavor note can be added to the product and, if all others are left unchanged, this flavor note could be measured and "added" to the flavor profile. By contrast, in the method of the invention, all the descriptor selections are made relative to other descriptors, so it is not possible to evaluate an individual descriptor's selection results on its own. Each descriptor selection score must be normalized with respect to the other descriptor scores.

The "winners" of each pair (i.e. the flavor descriptors selected as more intense from each descriptor pair by a user) are processed by normalizing means 26. The normalizing means may implement the following normalizing function, for example:

$$\text{intensity}(X) = (\text{wins}(X)+1)/(\text{wins}(X)+1+\text{losses}(X)+1)$$

In other words, the intensity value of descriptor X is calculated as the above function of wins(X), the number of times the descriptor X was selected instead of another descriptor, and losses(X), the number of times another descriptor was selected instead of the descriptor X. This calculation is carried out for each of the (e.g. thirteen) descriptor dimensions of the flavor descriptor space. The base value (i.e. the initial value before any wins or losses are recorded) is thus 50%. Note that this is just one example of a function for normalizing the selection results. Other normalizing formulae could be used.

The filtering means 25 may advantageously comprise means for detecting illogical or inconsistent selections of a user. For example, it may detect logical inconsistencies in responses such as (fruity*/nutty) (nutty*/spicy) (fruity/spicy*), where the asterisks indicate the user's selections for these three descriptor pairs. This may be an indication that the particular user finds it difficult to discern flavor notes, or certain types of flavor notes. When such an inconsistency is detected by the filtering means 25, the pairs or sets of pairs concerned can then be automatically re-prompted, by sending instructions via adaptive control communications link 32, until consistency is found. The filtering means 25 may use established machine learning techniques to determine rules for a particular user and/or a particular foodstuff or type of foodstuff, which can be fed back 32 to the selection means 21 to adapt the selection of the pairs of descriptors in such a way as to refine the responses of the particular user and/or a particular foodstuff or type of foodstuff for greater accuracy.

Tasters can be filtered for their ability to distinguish flavor notes consistently and reliably. In this case, the filter means 25 and the selection means 21 may be configured to present multiple sets of flavor descriptor pairs for the same product, and assess their consistency according to predetermined logical and numerical rules. For example, each successive ranking of the flavor note may be required to fall within a threshold of error in order that the taster's selection results can be accepted for mapping into the product profile in the flavor descriptor space in results database 8. Filter means 25 may be configured to detect logical inconsistencies between responses of an individual user (e.g. it may intervene if a user selects descriptors A, B and C such that A>B, B>C and C>A). In such cases, the filter means 25 may automatically adapt the sequence of descriptor pairs to circumvent or eliminate the inconsistent responses or reduce the weighting of the user's responses.

The various system elements referred to as "means" and described in functional terms in this text may be implemented as dedicated circuits or hardware elements or as instructions stored in a data carrier or operational memory and executed by a processing unit, or as a combination of these.

The method and system described above is designed to provide an accurate and consistent quantification of the flavor of a product. The normalized quantization of flavor descriptor information permits the generation of flavor profile information which is scaled rather than the declarative information of traditional tasting panel methods. This enables tastings carried out by different taster populations to be compared numerically with each other, so that flavor descriptor profiles from the different populations can be represented in the same descriptor space. The machine learning implemented in the filtering means 25 may, for example, include learning the different perception profiles of different tasters or different taster populations, and the flavor intensity profiles may be automatically adjusted using the learned rules. If the same product is tasted by two different groups, for example, using the same or similar descriptors, the filtering means 25 can be configured to automatically learn the differences in intensity scores calculated for the various descriptors from the two different flavor quantizations. These learned differences can then be used by the filtering means 25 to weight the descriptor intensity values higher or lower for a particular population, accordingly. This facilitates a meaningful efficiency gain in preference testing due to the ability to remove "non relevant" data points based on taste perception variations. This results in lower capacity utilization for market research activities.

Furthermore, the method of the invention can be adapted to enable the creation of an ideal or "target" profile for the product. This method, in comparison to traditional regression models that define preference drivers, requires less storage and processing capacity due to the adaptive nature of the question interface and increased accuracy of preference data when combined with individual perception measurement. In addition to the pairwise (i.e. binary) selections according to each taster's perception of the relative flavor note intensities, selections can be presented with prompts to determine a taster preference in each pair. Thus, in addition to "which flavor is more intense?", the question "which flavor would you prefer to be increased?" and/or "which flavor would you prefer to be decreased?" may be asked, relating to the same flavor descriptor pair. The selection responses to these preference pairs can be mapped and normalized into the flavor descriptor space for the product under analysis, in a similar way to that described above for the flavor descriptor perception selections, and can be used to create a target flavor profile which can be compared with the perception profile already described, and thereby to indicate what flavor changes may advantageously be made to the product in order to appeal to the general public insofar as the participating tasters are representative of the wider population. Thus, by using the scaled measurements of each user's feedback on which notes to increase/decrease, in combination with the original profile that the user created, a target profile can be generated for each user. This is expressed as an equation in which variables are the flavor tones. Coefficients are determined via the user's feedback. User feedback may be filtered and aggregated to create a "group" equation with aggregated coefficients. This may be used to generate the target profile. For example, if the original profile is defined by the function $F(x, y, z)$ and the aggregated group function is $0.3x, 0.4x, 1.2z$, then the target flavor intensity for x becomes $0.3x$, where x is the original intensity produced by the control panel as described above.

Figure 8:
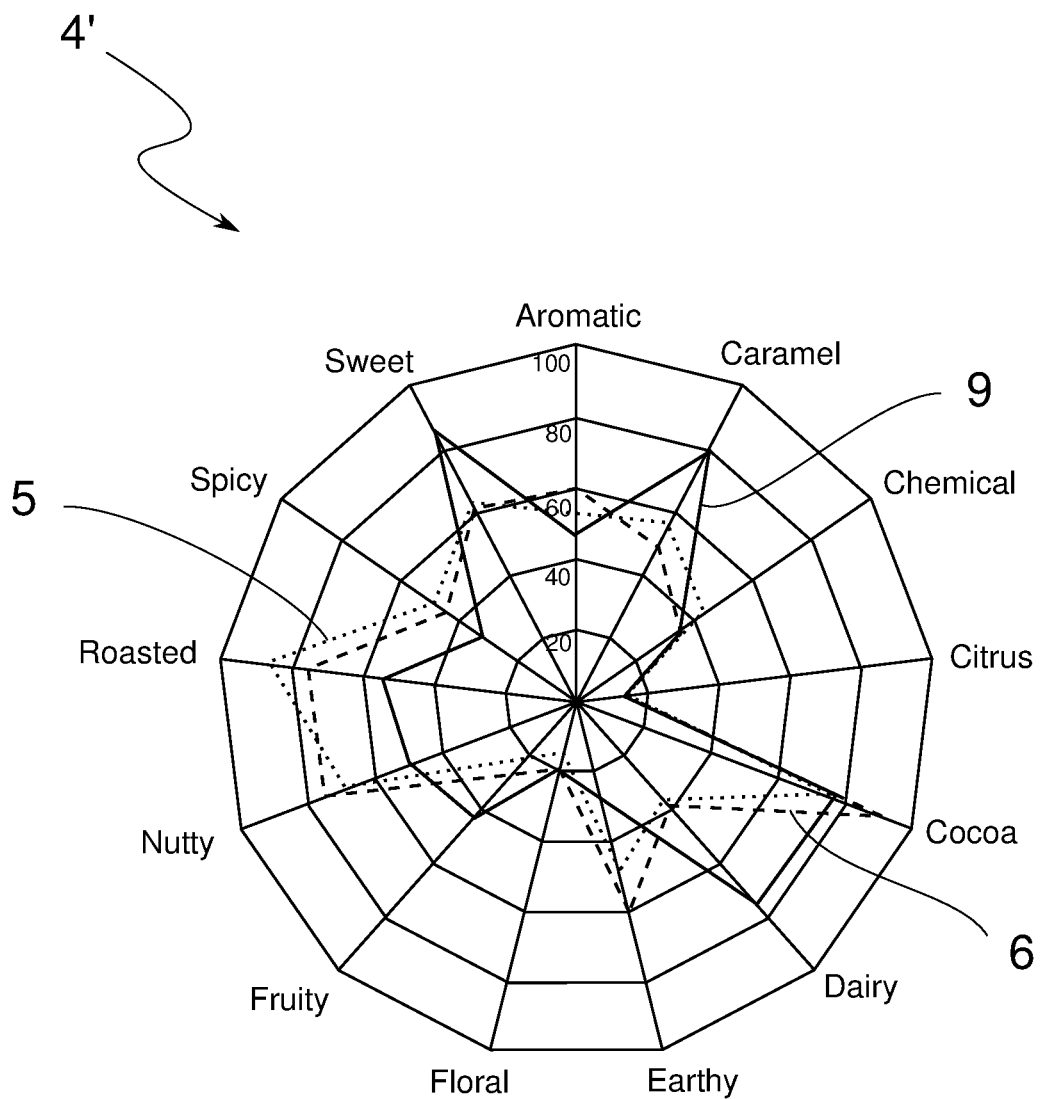
FIG. 8 shows an example of a flavor descriptor space with target flavor profile.

An example of a target flavor profile 9 is shown on the flavor profile space 4' illustrated in FIG. 8. In this example, the target profile 9 indicates that increasing the intensity values of "Sweet", "Dairy" and "Caramel" flavors in the product being tasted, and/or reducing the intensity values of the "Spicy", "Roasted", "Nutty" and "Aromatic", is likely to improve the flavor.

Figure 7:
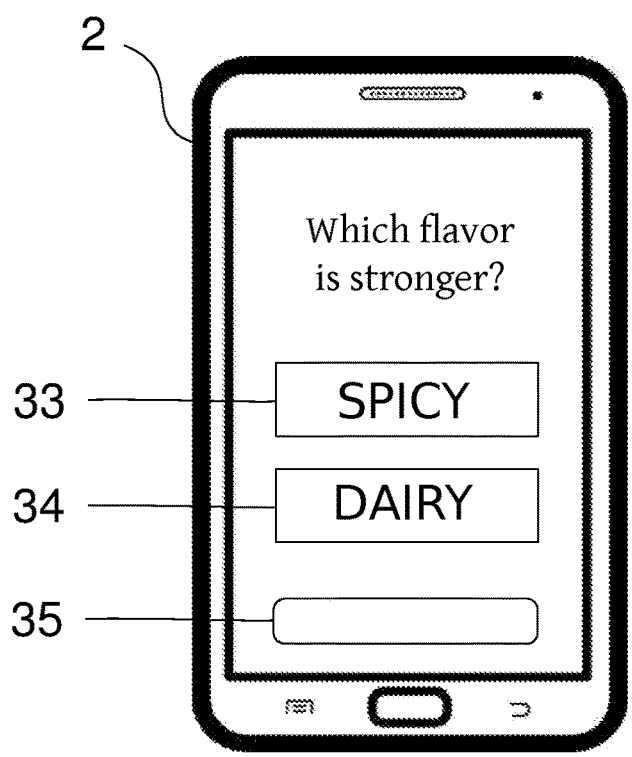
FIG. 7 shows a second variant of a user-device for carrying out a method according to the invention.

FIG. 7 shows a further variant of the invention. In addition to presenting pairs of flavor descriptors ("SPICY" and "DAIRY" in this case) for selection, an additional input field 35 can be provided for the user to input other information which can be quantified with the flavor descriptors. It is possible to present a list of alternative flavor descriptors, for example, which are not in the set of descriptors from which the pairs are selected, and to allow the user to provide additional selection or preference information by selecting a descriptor from the list. Alternatively, the extra field 35 can be a free-form field for collecting additional tasting feedback from the user.

While the invention has been described using pairwise flavor descriptors, it would also be possible to use triplets or even higher-order combinations of flavor descriptors for selection. However, the pairwise descriptors have been found to be preferable, since they make it easier for the tasters to distinguish the flavor notes, and the number of possible combinations of pairs is significantly lower. However, the adaptive nature of the algorithm allows the method to determine in what cases presenting more than two flavor notes is possible while retaining accuracy. Such inclusion of more than two selections is an additional efficiency gain as it reduces the returns to the server for question determination, thereby decreasing processing load time.

The invention claimed is:

1. A computer-implemented method of rendering, in a multi-dimensional descriptor space, and using descriptor variables capable of characterizing a predetermined stimulus, a descriptor profile of the stimulus, the method comprising:
    a first step of providing a plurality of different descriptor pairs from a host device to a user device of each of a plurality of users, wherein each pair comprises descriptors representing two different dimensions of the said descriptor space;
    a second step of, for said each user, using a graphical user interface on an output device of the user device to present a textual prompt and one of the descriptor pairs, of said plurality of different descriptor pairs provided in the first step, to the user, wherein each member of the descriptor pair is presented adjacent to the other on the graphical user interface, wherein each member is presented in a separate selectable area of the graphical user interface;
    a third step of, for said each user, the user indicates, by interacting with the selectable area associated with the members of the presented pair using the graphical user interface of the input device of the user device, which member of the presented pair more closely represents the user's perception of the stimulus, so that the graphical user interface of the user device receives the user's selection of the member of the presented descriptor pair which more closely represents the user's perception of the stimulus, whereupon receipt of the user's indication, the descriptor pair is removed from the graphical user interface;
    repeating the second and third steps successively for each of the descriptor pairs of said plurality of different descriptor pairs provided in the first step, so that second and third steps are carried out of each of the plurality of different descriptor pairs provided in the first step;
    a fourth step of using a network interface of the user device to communicate the user selections to the host device;
    a fifth step of creating a training set using previous user selection patterns, wherein the training set establishes a set of predetermined filter rules for categorizing user selections;
    a sixth step of training a machine learning algorithm using the training set, wherein the machine learning algorithm is iteratively trained until it can detect when user selections reach a predetermined level of convergence;
    a seventh step of filtering, using the trained machine learning algorithm, by reference to the set of predetermined filter rules, one or more of the received selections which fall outside a predetermined range, and omitting the one or more identified selections; and
    an eighth step of using normalizing processor of the host device to calculate, for each of the descriptors received from the user devices, a descriptor value in said perception space, and to normalize the value of each descriptor against the other descriptor values so as to generate a normalized perception profile of the predetermined stimulus in the descriptor space.

2. The method of claim 1, wherein the first step comprises generating all possible pairwise combinations of the descriptors.

3. The method of claim 2, wherein the generating of all possible pairwise combinations is performed by a processing unit of the user device.

4. The method of claim 1, wherein the first step comprises generating the descriptor pairs at the host device and communicating the generated descriptor pairs from the host device over a network to the user devices.

5. The method of claim 1, wherein the first step comprises using a randomizer of the host device or the user device to provide the descriptor pairs in a random or pseudo random sequence.

6. The method of claim 1, wherein the first step comprises an optimization step of adaptively providing the descriptor pairs in dependence on one or more of:
    historical information of prior selections of the user,
    historical information of prior filtering of selections of the user, or
    a current distribution of descriptor data points in the descriptor space.

7. The method of claim 1, in which the fifth step comprises weighting a descriptor with a higher descriptor value if the probability of that descriptor being selected is higher than that of other descriptors, and weighting a descriptor with a lower descriptor value if the probability of that descriptor being selected is lower than that of the other flavor descriptors.

8. The method of claim 1, wherein, if the set of received selections includes selections for fewer than all of the plurality of presented descriptor pairs, the method includes using a Bayesian engine of the host device to infer selection parameters for the missing ones of the descriptor pairs.

9. The method of claim 1, comprising using a filter and/or the normalizing processor of the host device to determine, for at least one of the users, weighting or correction parameters for at least one of the descriptors, and storing the weighting or correction parameters as rules of a machine learning engine.

10. The method of claim 1, comprising a step of recording, for each user, a change preference parameter for each of the first plurality of descriptors and using the normalizing processor to map the change preference parameters on to the descriptor space in such a manner as to indicate a cumulative change preference for each descriptor.

11. The method of claim 1, comprising receiving from said each user a selection of one or more additional descriptors which are not in the first plurality of descriptors, and adding the additional descriptors to the descriptor space and to the first plurality of descriptors.

12. The method of claim 1 further comprising:
    generating a first descriptor profile in the descriptor space;
    generating a second descriptor profile in the descriptor space with the first stimulus and a second plurality of users; and
    using the normalizing processor to generate, for each of the plurality of descriptors, a normalization mapping parameter for mapping descriptor values from the first descriptor profile to the second descriptor profile or from the second descriptor profile to the first descriptor profile.

13. The method of claim 1, wherein:
the predetermined stimulus comprises the taste or smell of a foodstuff,
the users are tasters of said foodstuff,
the descriptors comprise flavor or aroma descriptors of the foodstuff,
the descriptor values comprise intensity values of the flavor or aroma, and
the descriptor space is a flavor or aroma descriptor space.

14. The method of claim 1, wherein:
the predetermined stimulus comprises a color of a radiant or reflective object,
the users are viewers of said object,
the descriptors comprise color descriptors of the object,
the descriptor values comprise color values of the flavor or aroma, and
the descriptor space is a color space.

15. System for determining quantified intensity values of a plurality of predetermined flavor descriptors of a substance under analysis, the system comprising a host device and a plurality of user devices, whereby the host device comprises:
a first database containing a plurality of predetermined flavor descriptors of the substance;
a transmission device communicating the flavor descriptors to each of the user devices; wherein each of the user devices are configured to (i) receive a plurality of different descriptor pairs from the host device, wherein each pair comprises descriptors representing two different dimensions of the said descriptor space; (ii) present a textual prompt and one of the descriptor pairs, of said plurality of different descriptor pairs received in step (i), to the user through a graphical user interface, wherein each member of the descriptor pair is presented adjacent to the other on the graphical user interface, wherein each member is presented in a separate selectable area of the graphical user interface; (iii) receive the user's selection of the member of the presented descriptor pair by interacting with the selectable area associated with the members of the presented tor pair, which more closely represents the user's perception of the stimulus at the graphical user interface, whereupon receipt of the user's selection, the descriptor pair is removed from the graphical user interface; (iv) repeat the steps (ii) and (iii) successively for each of the descriptor pairs of said plurality of different descriptor pairs provided in step (i), so that steps (ii) and (iii) are carried out of each of the plurality of different descriptor pairs provided in step (i);
a processor configured to:
receive flavor descriptor selections of the substance from each of the user devices create a training set using previous user selection patterns, wherein the training set establishes a set of predetermined filter rules for categorizing user selections; and
train a machine learning algorithm using the training set, wherein the machine learning algorithm is iteratively trained until it can detect when user selections reach a predetermined level of convergence;
filter, by reference to the set of predetermined filter rules, using the trained machine learning algorithm to detect inconsistent or illogical or incomplete selection responses among the flavor descriptor selections received from the one or more user devices,
calculate, for each of the first plurality of predetermined flavor descriptors, from the selection response for the said each flavor descriptor, a flavor descriptor intensity value in a flavor descriptor intensity space, and to normalize the flavor descriptor intensity value against the flavor descriptor intensity values of substantially all of the others of the first plurality of flavor descriptors in the flavor descriptor intensity space.

16. System according to claim 15, wherein the machine learning algorithm is configured to determine rules for weighting or correcting or omitting selection responses of the selection responses received from the user devices.

17. System according to claim 15, wherein the filter comprises an adaptive control output signal for communicating to a selector, a control instruction for modifying a sequence of descriptor pairs selected by the selector in dependence on an anomaly or inconsistency condition detected in the selection responses by the filter.

* * * * *